A. W. SHROYER.
PAVING TOOL.
APPLICATION FILED OCT. 4, 1910.
985,214.
Patented Feb. 28, 1911.
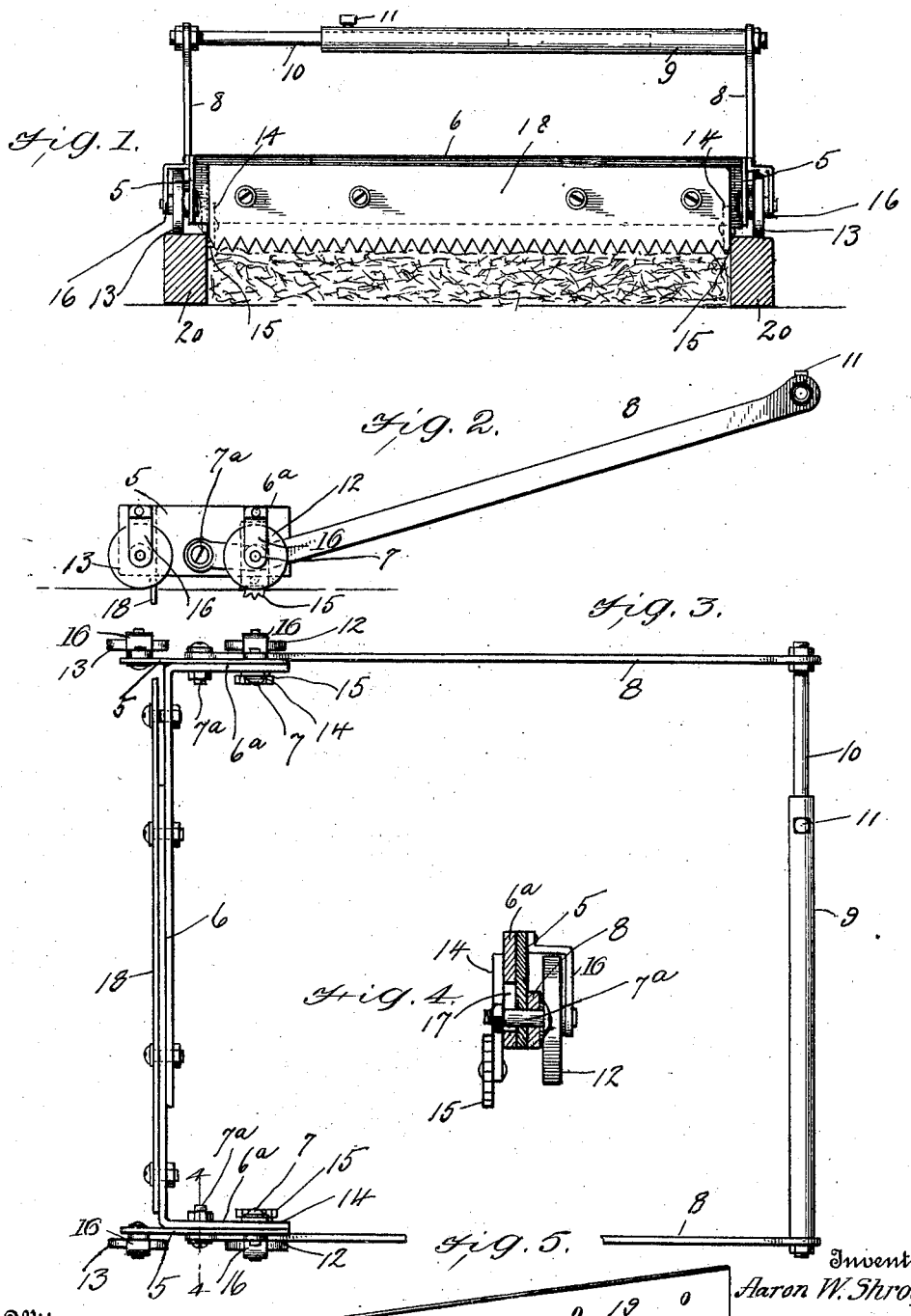
Inventor
Aaron W. Shroyer

UNITED STATES PATENT OFFICE.

AARON W. SHROYER, OF DURHAM, NORTH CAROLINA.

PAVING-TOOL.

985,214. Specification of Letters Patent. Patented Feb. 28, 1911.

Application filed October 4, 1910. Serial No. 585,177.

*To all whom it may concern:*

Be it known that I, AARON W. SHROYER, a citizen of the United States, residing at Durham, in the county of Durham and State of North Carolina, have invented certain new and useful Improvements in Paving-Tools, of which the following is a specification.

This invention relates to apparatus for spreading the top stuff or wearing surface of cement or granolithic sidewalks, and it has for its object to provide a device of this kind which can be easily operated, and which is highly efficient in operation, and capable of certain adjustments to be hereinafter described.

In order that the invention may be better understood, reference is had to the accompanying drawing, forming a part of this specification, in which drawing, Figure 1 is a front elevation of the device, in operative position, the sidewalk being shown in section; Fig. 2 is a side elevation of the device; Fig. 3 is a plan view thereof; Fig. 4 is a cross section on the line 4—4 of Fig. 3, and, Fig. 5 is a perspective view of a different scraper blade.

Referring specifically to the drawing, the device comprises a wheeled frame carrying a scraper blade, and provided with a handle. The wheeled frame comprises spaced side pieces 5 which are connected across by a sectional bar, the two sections of which are indicated at 6. The sections overlap and are bolted together, and their inner ends are bent to extend along the inner faces of the side pieces as indicated at 6ª and are secured thereto by bolts or other suitable fastening means 7 and 7ª respectively.

To the outer faces of the side pieces 5 are secured handles comprising rearwardly extending side bars 8 which are connected at their outer ends by a grip which is in two sections, indicated at 9 and 10, respectively. The section 9 is tubular, and the other section extends thereinto, to form a telescopic joint for a purpose to be presently described. The sections are locked in adjusting position by means of a set screw 11 which is threaded through the tubular section to engage that portion of the other section which extends thereinto.

On the outer faces of the side pieces 5 are mounted wheels 12 and 13. To the inner faces of the side pieces 5 are secured guide members comprising shanks 14 carrying rowels 15. The shanks 14 are secured by the bolts 7, the latter also serve as the axles of the rear wheels 12. The axles are steadied by braces 16 extending therefrom to the side pieces 5.

The bolts 7ª pass through vertical slots 17 in the parts 6ª in order that the sections 6 may be raised or lowered with respect to the side pieces 5. The sections 6 carry a scraper blade 18 which is bolted or otherwise secured thereto so as to extend transversely between the side pieces 5. The lower edge of the blade is below the corresponding edge of the sections 6, and in Fig. 1 said lower edge of the blade is shown as serrated. In Fig. 4 is shown a blade 19 having a straight lower edge. The blade 18 will be used for leveling the concrete, after which the blade 19 will be used for smoothing the surface of the concrete. The blades will be made in various lengths so that the tool may be used on sidewalks of different widths. The tool can be readily adjusted according to the length of the blade desired, by disconnecting the sections 6 and loosening the set screw 11. The bolts which fasten the sections 6 together also serve to secure the blade.

In operation, a blade is selected to suit the width of the sidewalk, and the tool is then adjusted according to the length of said blade, and the latter is fastened in place. The tool is supported above the bed of concrete by means of the wheels 12 and 13, said wheels traveling on the side rails 20 of the form which incloses the bed of concrete. By means of the handle, the tool is now carried back and forth across the concrete, the serrated scraper blade spreading and leveling the material, after which it is smoothed by substituting blade 19. The blade is located in front of the rear wheels 12, so that it may be elevated above the surface of the material by swinging the handles downwardly, the blade then swinging upwardly, the rear wheels serving as the fulcrum. The tool is prevented from rolling off the rails 20 by the rowels 15, the latter sliding along the inner faces of the rails when the tool is in operation.

I claim:

1. A paving tool comprising spaced side members, a sectional cross-bar connecting said members, the sections of the cross-bar being adjusted relatively to each other in the direction of their length, means for holding the sections in adjusted position, and a scraper blade carried by the cross-bar.

2. A paving tool comprising spaced side members, a sectional cross-bar connecting said members, bars extending rearwardly from the side members, a sectional hand-grip connecting said rearwardly extending bars, the sections of the hand-grip and the cross-bar being adjustable in the direction of their length, means for holding the sections in adjusted position, and a scraper blade carried by the cross-bar.

In testimony whereof I affix my signature in presence of two witnesses.

AARON W. SHROYER.

Witnesses:
JNO. F. HARWARD,
JNO. J. THAXTON.

---

Copies of this patent may be obtained for five cents each, by addressing the "Commissioner of Patents, Washington, D. C."